W. R. GARNER.
NUT LOCK.
APPLICATION FILED MAR. 31, 1909.
930,954.
Patented Aug. 10, 1909.
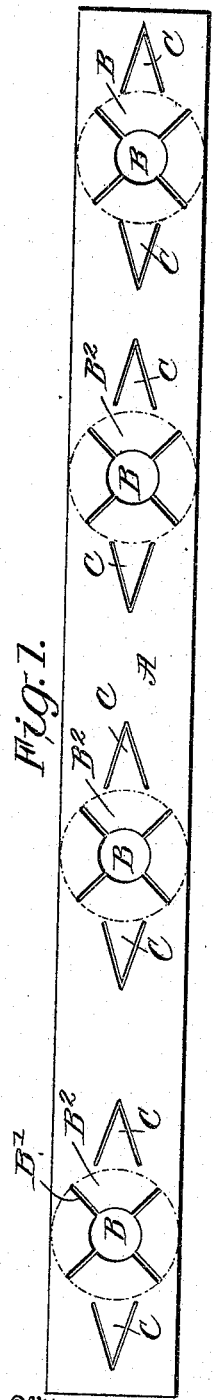
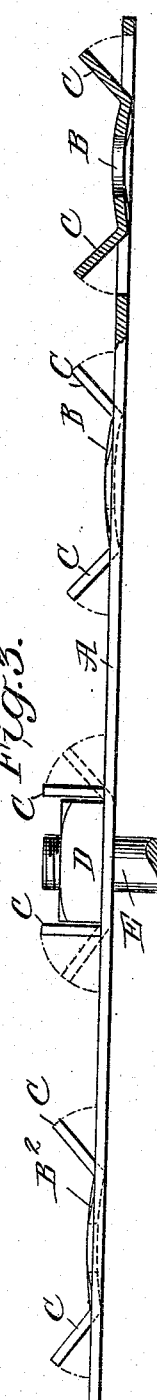
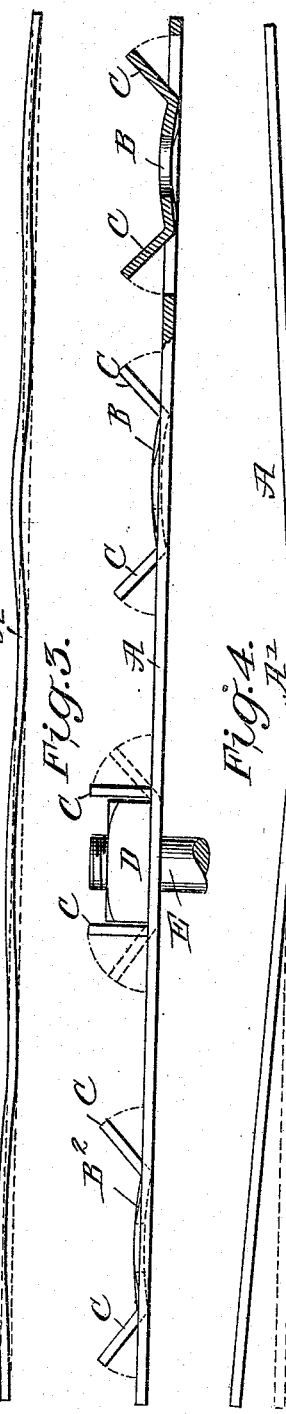
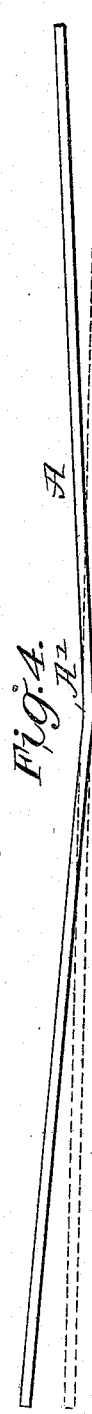
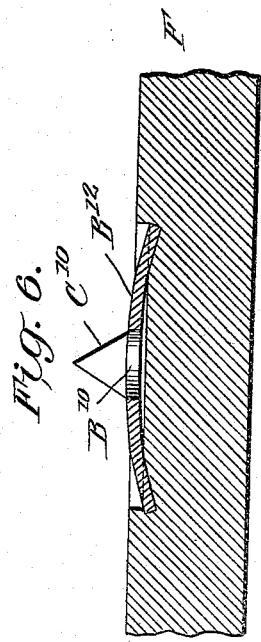
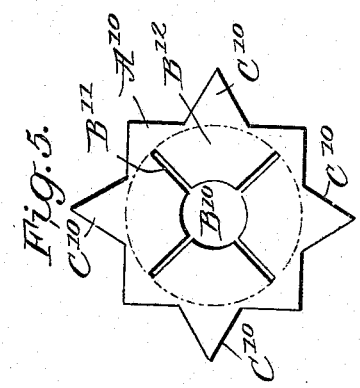
Witnesses
Samuel E. Wade
Perry B. Turpin
Inventor
WILLIAM R. GARNER
By
Attorneys

UNITED STATES PATENT OFFICE.

WILLIAM ROBERT GARNER, OF PALESTINE, TEXAS.

NUT-LOCK.

No. 930,954.  Specification of Letters Patent.  Patented Aug. 10, 1909.

Application filed March 31, 1909. Serial No. 486,874.

*To all whom it may concern:*

Be it known that I, WILLIAM ROBERT GARNER, a citizen of the United States, and a resident of Palestine, in the county of Anderson, State of Texas, have made certain new and useful Improvements in Nut-Locks, of which the following is a specification.

This invention is an improvement in nut locks especially in that class of nut locks and plates designed for use on railroad joints, frogs, cars, bridges and the like as well as in engines, iron fencing, buggies, wagons and otherwise where similar locks can be employed; and the invention consists in certain novel constructions, and combinations of parts as will be hereinafter described and claimed.

In the drawings Figure 1 is a face view, and Fig. 2 is an edge view of a nut lock plate embodying my invention. Fig. 3 is an edge view of the plate showing some of the lugs adjusted to position to lock a nut. Fig. 4 is an edge view of the plate illustrating the spring deflection thereof from a central point, and Figs. 5 and 6 are respectively, face and sectional views illustrating a timber lock nut washer, all of which will be described.

The plate A, see Figs. 1 to 4, is provided with bolt holes B, and may have its ends deflected from a central point A' as shown in Fig. 4 to hold the parts in close contact when the nuts are screwed home. This deflection of the plate A from a central point A' provides for the bearing of the said plate on the splice bars which are between the bolts so that when the nuts are screwed to a bearing, the plate will through the spring action thus produced hold the parts in close contact and prevent any motion or unnecessary wear of the different parts.

The plate A surrounding the bolt holes B is slotted at B' radially outwardly from the said bolt holes and this slotted portion surrounding the bolt holes B is stamped or punched outwardly in convex form, see Figs. 2 and 3, forming a spring seat for the nuts, thus providing for taking up such lost motion as may occur between any of the parts, and the edges formed by the slots B' will afford a somewhat rough bearing for the nuts as the latter are turned home, thus increasing the locking action resulting from the spring of the convex portions of the locking plate. Adjacent to these convexed portions $B^2$ of the locking plates I punch from the said locking plates lugs C whose free ends are remote from the convexed portions $B^2$, so the said lugs C can be turned upwardly along side the nut D as shown in Fig. 3, to securely lock the said nut from turning on its bolt E.

In Figs. 5 and 6 I illustrate a timber lock nut washer in which the plate $A^{10}$ corresponding to the plate A in Fig. 1 has a bolt hole $B^{10}$ from which radiate slots $B^{11}$ and the portion $B^{12}$ of the washer surrounding the hole $B^{10}$ is convexed as in Fig. 1, the plate $A^{10}$ being provided with projecting lugs $C^{10}$, some of which may be turned up to bear along side a nut as shown in Fig. 6, while others may be pressed down into the wood F as shown in Fig. 6, to lock the plate from turning.

I claim—

1. The nut locking plate herein described bent at its middle portion, and inclined generally from said intermediate portion outwardly toward its opposite ends forming forwardly springing arms on opposite sides of said intermediate bend, and provided in said arms with bolt holes, with convexed portions surrounding said bolt holes and slotted therefrom and having adjacent to said convexed slotted portions lugs adapted to be bent alongside a nut seated against said convexed portions, all substantially as and for the purposes set forth.

2. A nut locking plate having bolt holes, convexed portions surrounding said bolt holes and slots leading from said bolt holes and subdividing the convexed portions and provided in line between the said slots and outside of the convexed portions with lugs adapted to be bent alongside a nut seated on said convexed portion, substantially as set forth.

3. A nut locking plate having a bolt hole, a convexed portion surrounding the bolt hole, and slots leading from the bolt hole and subdividing the convexed portion, and a lug or lugs adjacent to said convexed portion and outside the same, and in line between the slots of the convexed portion and adapted to be bent upwardly along side a nut seated on said convexed portion, substantially as set forth.

WILLIAM ROBERT GARNER.

Witnesses:
J. E. MILLER,
C. H. STUNG.